United States Patent Office 2,984,647
Patented May 16, 1961

2,984,647
SYNTHETIC LINEAR CONDENSATION POLYMERS
Trevor Raymond White, West Pontnewydd, Cwmbran, England, assignor to British Nylon Spinners Limited, Pontypool, Monmouthshire, England
No Drawing. Filed June 11, 1959, Ser. No. 819,559
Claims priority, application Great Britain June 14, 1958
4 Claims. (Cl. 260—45.75)

The present invention relates to the stabilization of synthetic linear condensation polymers. The invention is particularly concerned with stabilizing the aforesaid polymers against impairment of their properties by the action of light.

Synthetic linear condensation polymers such as polyesters, polyamides, e.g. polyhexamethylene adipamide, are widely used for making textile and other products, for instance, yarns, fabrics, which are noted for their attractive properties including great strength i.e. a high tenacity. Since a dull or delustred effect is frequently required, the polyamide (or other synthetic linear polymer) employed has commonly added to it a small quantity of titania. Prolonged exposure to light, however, as in the case of curtains hung at windows, gradually impairs the properties of the polyamide, especially in the presence of titania. The strength declines and the curtains become tender.

Numerous proposals have been made to prevent or alleviate the above effect of light by incorporating small quantities of salts in the polymer. The addition of manganese in the form of various salts of organic and inorganic acids was disclosed in British application No. 3,725/42 of Société Rhodiaceta as laid open to public inspection, for example, manganous lactate. British specification No. 793,132 describes synthetic linear condensation polymers containing small quantities of manganous compounds having a reducing anion, the preferred compounds being manganous oxalate, manganous sulphite and manganous hypophosphite ($Mn(H_2PO_2)_2$). There is, however, no mention of phosphates in the aforesaid prior art. Nor would the definition of reducing anion in 793,132 include phosphates.

It has now been found that manganous phosphates are effective in increasing the stability to light of synthetic linear condensation polymers, especially in the presence of titania. The manganous phosphates may be incorporated in the polymer at any stage in its manufacture; they may thus be mixed with the polymer starting materials before the polymerization commences, or they may be introduced during the process of polymerization or they may be added to the molten finished polymer, which they do not discolor; they also have the advantage that their presence does not cause discoloration of the polymer, when the latter is bleached with sodium chlorite. Manganous lactate and manganous hypophosphite, which are disclosed in the above-mentioned prior publications, on the other hand, tend to cause discoloration during bleaching with chlorite.

Accordingly this invention relates to synthetic linear condensation polymers in which there have been incorporated small quantities of a phosphate of divalent manganese, or a complex phosphate of divalent manganese together with ammonia and/or an alkali metal.

The invention includes shaped articles of synthetic linear condensation polymers containing manganous phosphates (or mixed phosphates of divalent manganese with ammonia and/or an alkali metal) such as for example, fibres, filaments, yarns, fabrics and other textile materials.

Examples of phosphates for use in the present invention are:

Manganous ortho-phosphate
Manganous ammonium orthophosphate
Manganous pyrophosphate
Manganous hexa-metaphosphate ($Mn_3P_6O_{18}$)
Manganous lithium orthophosphate
Manganous sodium orthophosphate
Manganous potassium orthophosphate
Manganous potassium pyrophosphate ($K_2MnP_2O_7$)

In the following examples which are intended to illustrate but not limit the invention, the parts and percentages are by weight.

Example 1

0.169 part of manganous ammonium ortho-phosphate monohydrate ($Mn.NH_4.PO_4.H_2O$) is mixed with 50 parts of ground polyhexamethylene adipamide containing 1.6% (calculated on the polymer) of titania and the mixture melted under pure nitrogen by heating to 300° C. The product is cooled, broken up in a hammer mill and ground. 5 parts are then mixed with 45 parts of ground polyhexamethylene adipamide containing 1.6% titania and the mixture melted. The resulting polymer containing 100 parts per million (calculated on the polymer) of manganese in the form of manganous ammonium phosphate, is rod-spun into a 5-filament yarn. The latter is cold-drawn at a draw ratio of 3.80 to give a 30 denier yarn.

The above yarn does not discolor on treatment for ½ hour at 85° C. with 50 times its weight of a solution of 1.5 parts of sodium chlorite and 1 part of glacial acetic acid in 1,000 parts of water.

Example 2

0.5 part of the polyhexamethylene adipamide containing 1.6% titania (calculated on the polymer) and manganous ammonium phosphate corresponding to a concentration of 1,000 parts per million of manganese, is made as described in Example 1, and mixed with 9.5 parts of polyhexamethylene adipamide containing 1.6% titania. The mixture is melted under nitrogen at 300° C. The resulting polymer thus contains 50 parts per million of manganese. A film of thickness 0.002" of this polymer is cast from a 10% solution of the polymer in 98% aqueous formic acid. Similar films are cast of polyhexamethylene adipamide containing 1.6% titania but no manganese compound and of polyhexamethylene adipamide containing 1.6% titania together with manganous lactate corresponding to a concentration of 40 parts per million of manganese.

The films are exposed in oxygen to radiation from a high pressure mercury lamp for 116 hours and the intrinsic viscosities (as defined below) of the exposed films are determined and compared with the intrinsic viscosities of the unexposed films.

The following results are obtained. These illustrate the superior light resistance of the polymer containing the manganous ammonium phosphate, since the decrease of viscosity can be regarded as a measure of the degradation occurring.

| Film of polyhexamethylene adipamide containing 1.6% titania and— | Intrinsic viscosity | | Percentage decrease of viscosity during exposure |
|---|---|---|---|
| | Before exposure | After exposure | |
| No manganese | 0.90 | 0.62 | 31.1 |
| 40 p.p.m. manganese as manganese lactate | 0.97 | 0.85 | 12.3 |
| 50 p.p.m. manganese as manganous ammonium phosphate | 0.93 | 0.89 | 4.2 |

The phrase "intrinsic viscosity" employed herein signifies the value obtained by plotting against $x$ a graph of the expression $(\log_e v)/x$, where $v$ is the quotient of the viscosity at 25° C. of a solution of the polymer in 90% weight by weight aqueous formic acid as solvent, divided by the viscosity of the said solvent at the same temperature, and $x$ the concentration of polymer in the said solvent in grams per 100 mils of solution, and extrapolating to zero concentration.

*Example 3*

0.154 part of manganous pyrophosphate trihydrate ($Mn_2P_2O_7 3H_2O$) is mixed with 50 parts of ground polyhexamethylene adipamide containing 0.3% titania in the manner described for manganous ammonium phosphate in Example 1. The resulting product containing approximately 1,000 parts per million of manganese is not discolored on treatment (as in Example 1) with aqueous sodium chlorite acidified with acetic acid.

5 parts of this polyamide are mixed with a further 45 parts of polyhexamethylene adipamide containing 0.3% titania and the mixture melt extruded to give a yarn. The latter is cold drawn. The resulting white 30 denier 3 filament-yarn contains 95 parts per million of manganese.

*Example 4*

1 part of titania is dispersed in 10 parts of an aqueous solution containing 1.0% of sodium hexametaphosphate by stirring for 4 hours. 10 parts of an aqueous solution containing 0.4% of manganous sulphate tetrahydrate ($MnSO_4.4H_2O$) are added and the slurry stirred for a further 1 hour. The slurry is then centrifuged and the sediment consisting of titania and manganous hexametaphosphate is redispersed by stirring with 10 parts of water. The resulting slurry is employed in the manufacture of polyhexamethylene adipamide in the following way.

100 parts of hexamethylene diammonium adipate and 0.225 part of glacial acetic acid are dissolved in 120 parts of water and the solution obtained is introduced into an autoclave. The temperature is raised so that the air is swept out by the steam generated. The autoclave is then sealed and the temperature raised to 220° C. during 2 hours. The above-mentioned slurry is now pumped into the autoclave under pressure and the temperature raised to 275° C. during 1 hour, the pressure being gradually reduced to atmospheric pressure.

The resulting polyamide is extruded as a ribbon, which is melt-spun into a yarn, the latter being cold-drawn at a ratio of 4.2. The yarn so obtained is white and contains 1.15% titania and 57 parts per millon of manganese. It does not discolor when treated, as described in Example 1, with aq. sodium chlorite acidified witht acetic acid.

*Example 5*

A polyamide is made by heating the following mixture at 250° C. for two hours; the pressure is maintained at 250 lbs. per sq. in. by means of a valve adjusted to release steam on the said pressure being exceeded:

| | Parts |
|---|---|
| Hexamethylene diammonium adipate | 66 |
| Water | 34 |
| Acetic acid | 0.15 |
| Titania | 1.0 |
| Manganous pyrophosphate trihydrate | 0.018 |

At the end of the two hours the pressure is allowed to fall to atmospheric pressure and the polymerization completed by heating thereunder at 270° C. for ½ hour.

The resulting polyamide which contains 50 parts per million of manganese is melt-spun into yarn containing 13 filaments and having a total denier of 40.

*Example 6*

Example 5 is repeated except that instead of being introduced at the commencement of the polymerization, the manganous pyrophosphate is added to the partially made polymer, when the pressure has been allowed to fall to atmospheric pressure. The polyamide obtained is melt-spun into 40 denier yarn containing 13 filaments.

The polyamide yarns of Examples 5 and 6 show superior resistance to light when compared with a similar polyamide yarn "A" which is devoid of manganese. The comparison is made by exposing the yarns for 300 hours in a carbon arc fugitometer and determining the decrease in breaking load expressed as a percentage of the original breaking load.

| Yarn: | Percentage decrease in breaking load |
|---|---|
| A | 61½ |
| Example 5 | 13 |
| Example 6 | 26½ |

The polyamide yarns of Examples 5 and 6 are knitted into a fabric and bleached by immersion in an aqueous bleaching bath containing 0.1% sodium chlorite and 0.05% glacial acetic acid. The bath is warmed to 85° C. during 15 minutes and maintained thereat for ½ hour.

A similar polyamide yarn "B" containing an equivalent amount of manganous lactate instead of the pyrophosphate, is likewise knitted into a fabric and bleached with sodium chlorite.

The above three bleached fabrics are then examined in the EEL reflectance spectrometer (obtainable from the Evans Electro-Selenium Co. of Harlow, Essex). For this purpose the instrument is adjusted so as to give a 100% reflectance reading with white light (magnesium carbonate block). The fabrics are inserted and the percentage reflectance readings obtained are quoted below.

The experiment is repeated with red light. In this case the instrument is first adjusted to give a 100% reflectance reading with filter No. 608 (the red filter). The fabrics are then inserted and the red reflectance determined.

The experiment is then performed in a similar manner with blue light by using the blue filter No. 302.

The results are as follows:

| Yarn of which fabric is made | Percentage reflectance | | |
|---|---|---|---|
| | White | Red | Blue |
| B | 81.5 | 82.2 | 69.0 |
| Example 5 | 84.0 | 82.5 | 78.5 |
| Example 6 | 88.0 | 87.8 | 90.5 |

A quantitative estimate of the yellow discoloration of the fabric is got by subtracting the blue percentage reflectance from the red percentage reflectance, thus:

| Yarn | Yellow discoloration |
|---|---|
| B | 82.2 minus 69.0 equals 13.2 |
| Example 5 | 82.5 minus 78.5 equals 4.0. |
| Example 6 | 87.8 minus 90.5 equals minus 2.7. |

The improved whiteness, after chlorite bleaching, of the fabrics according to the present invention, is clearly shown.

*Example 7*

A polyamide is made by heating at 250° C. for 2 hours under 250 lbs. per sq. in. pressure, the following mixture:

| | Parts |
|---|---|
| Hexamethylene diammonium adipate | 66 |
| Water | 34 |
| Acetic acid | 0.15 |
| Titania | 0.017 |

The pressure is then reduced to atmospheric pressure and 0.0085 part of manganous pyrophosphate trihydrate added. The heating is continued at 270° C. under atmospheric pressure, and the resulting polyamide melt-spun into yarn of 840 denier having 140 filaments.

The stability of the above yarn is compared with that of another polyamide yarn, which is similar except that it contains no manganous pyrophosphate, by exposing both yarns in a stream of oxygen to the radiation from a xenon arc for 200 hours. The object of the oxygen is to accelerate the test. The intrinsic viscosity of both yarns is measured before and after the irradiation, and the percentage fall in intrinsic viscosity calculated. The polyamide yarn devoid of manganous pyrophosphate loses 31% of its intrinsic viscosity, whereas the yarn of Example 7 according to the invention only loses 13%.

What I claim is:

1. A synthetic linear polyamide in which there has been incorporated a small quantity of a phosphate selected from the group consisting of divalent manganese phosphates and complex phosphates of divalent manganese together with a cation selected from the group consisting of ammonia and alkali metals.

2. A synthetic linear condensation polymer as claimed in claim 1 wherein the polyamide is polyhexamethylene adipamide.

3. A synthetic liner condensation polymer as claimed in claim 2 wherein the phosphate is manganous pyrophosphate.

4. Shaped articles such as fibres, filaments, yarns, fabrics, whenever made of a synthetic linear condensation polymer as claimed in claim 1.

References Cited in the file of this patent

UNITED STATES PATENTS 2,887,462    Van Oot ---------------- May 19, 1959

FOREIGN PATENTS 955,259    France ------------------ Jan. 9, 1950